J. R. JOHNSON.
MILLING MACHINE SPINDLE HEAD.
APPLICATION FILED SEPT. 9, 1913.
1,143,585.
Patented June 15, 1915.
4 SHEETS—SHEET 1.
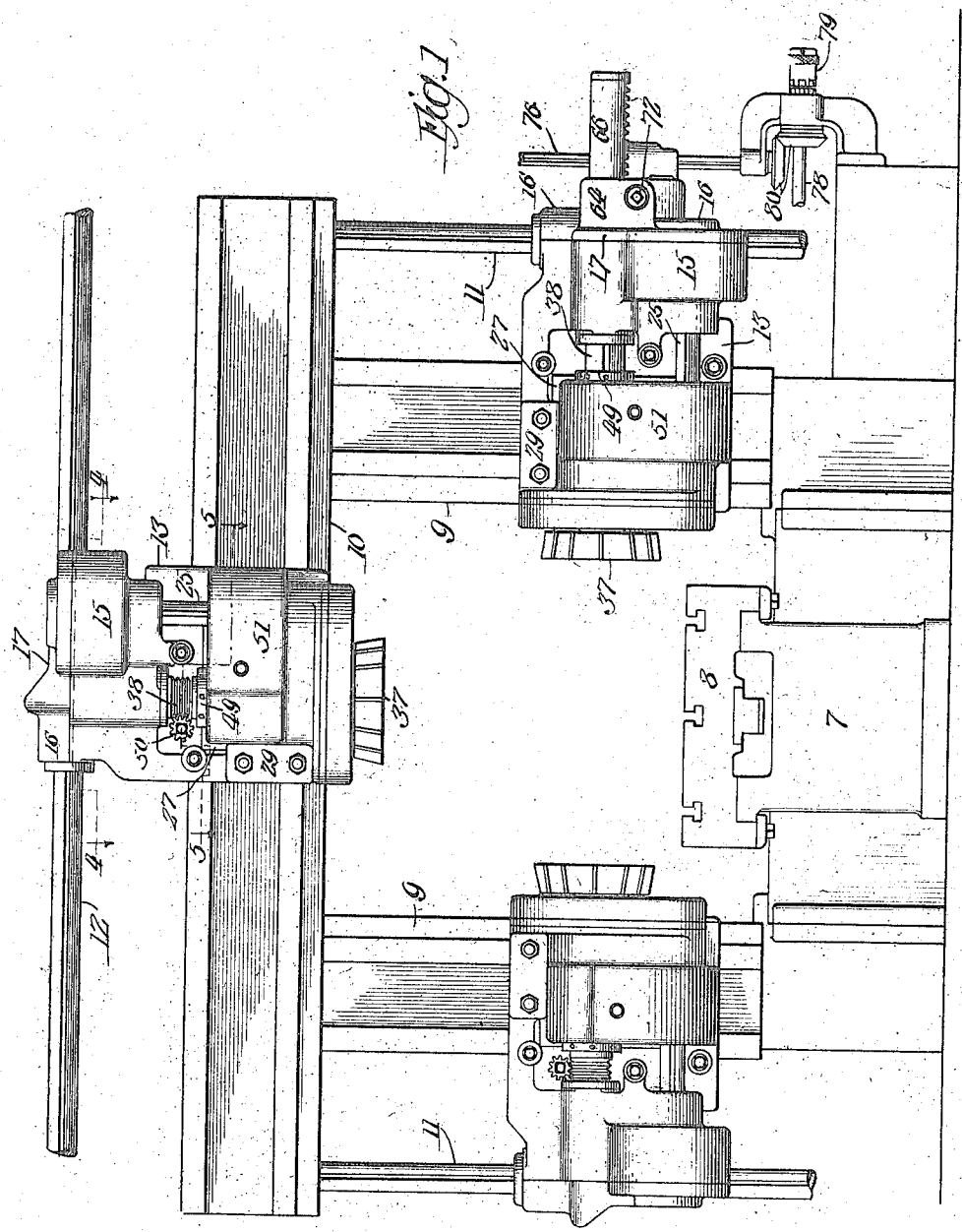
Witnesses:
Harold G. Barrett
John F. McCanna Jr.
Inventor
John R. Johnson
By A. O. Behel
Atty.

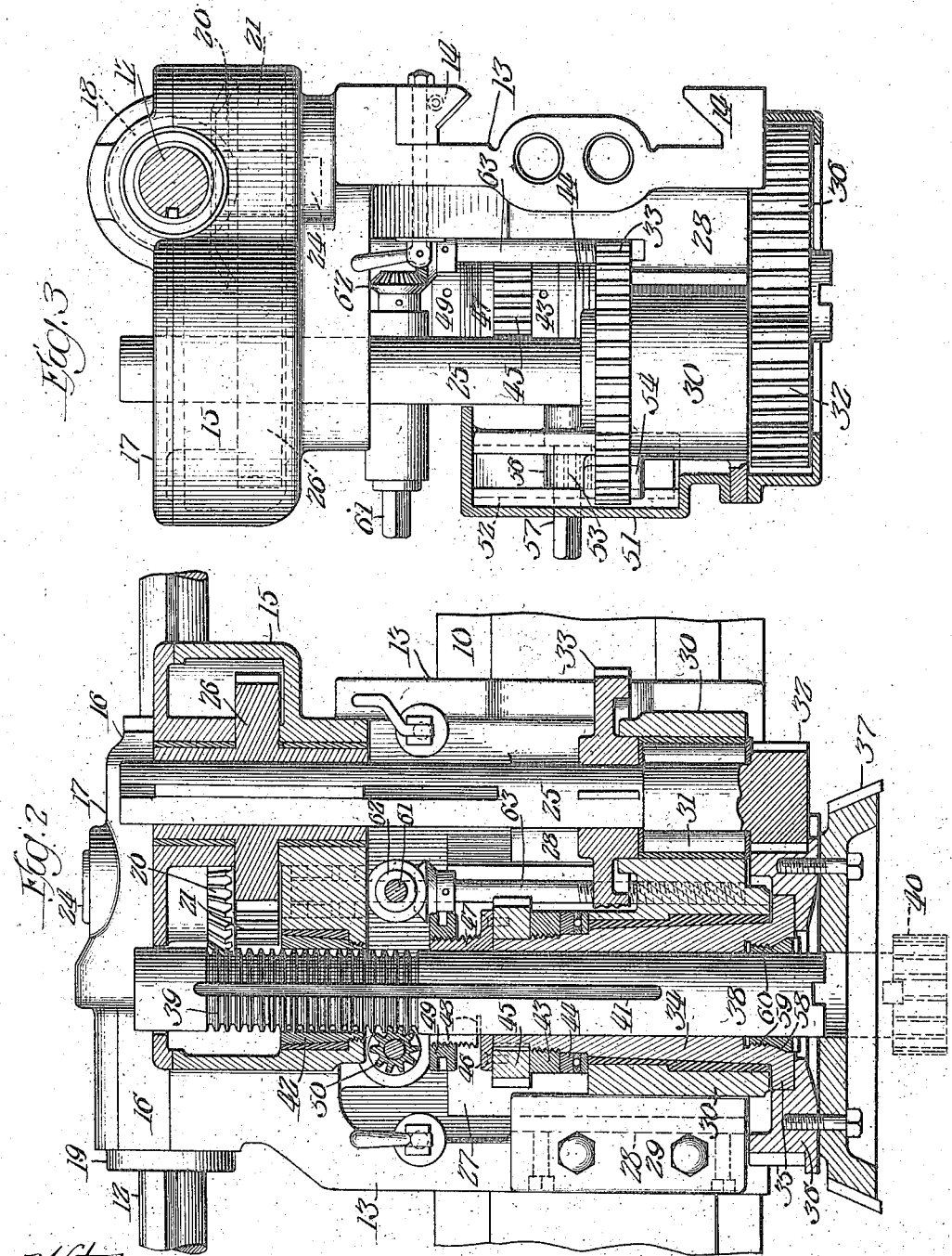

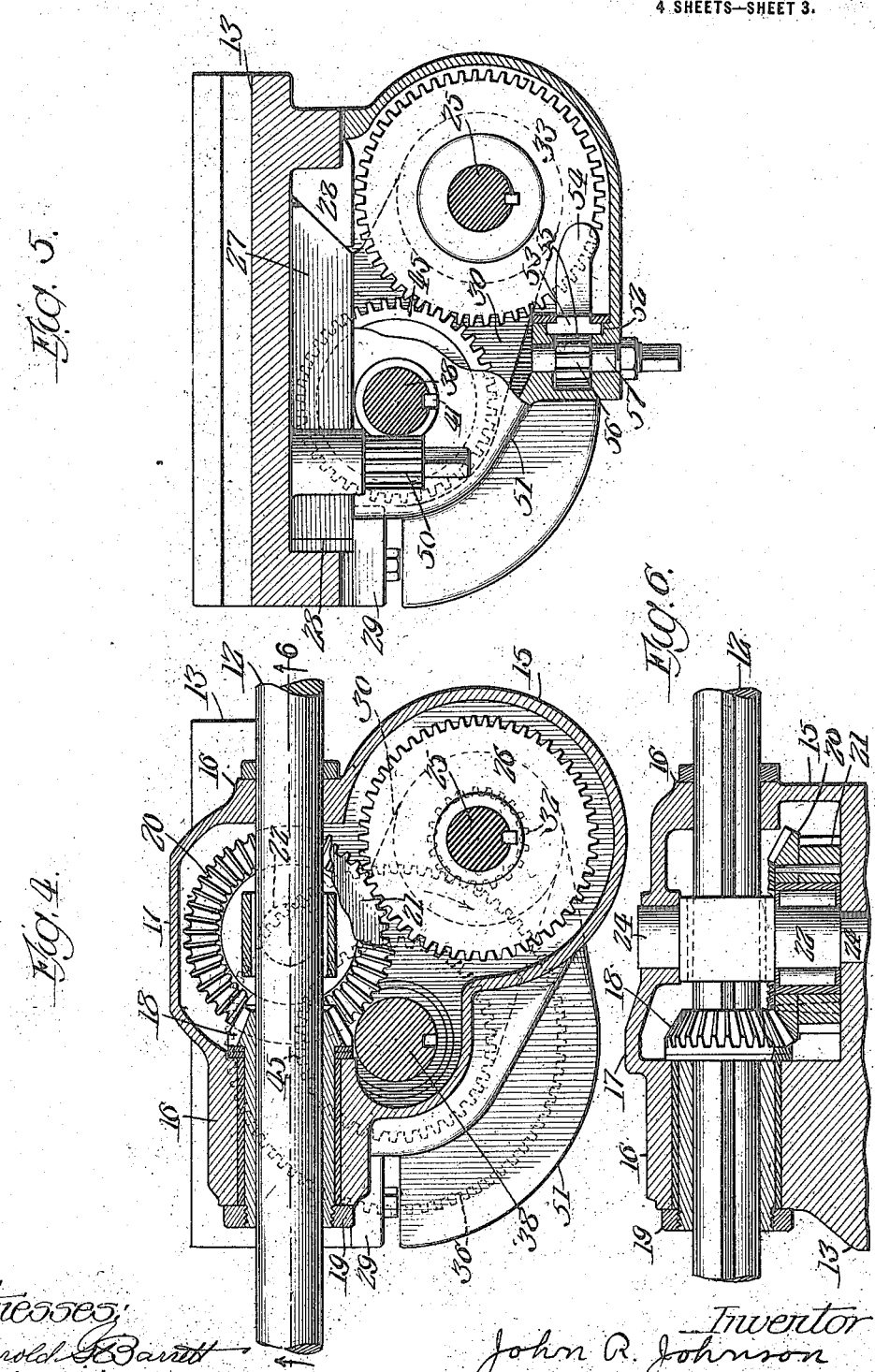

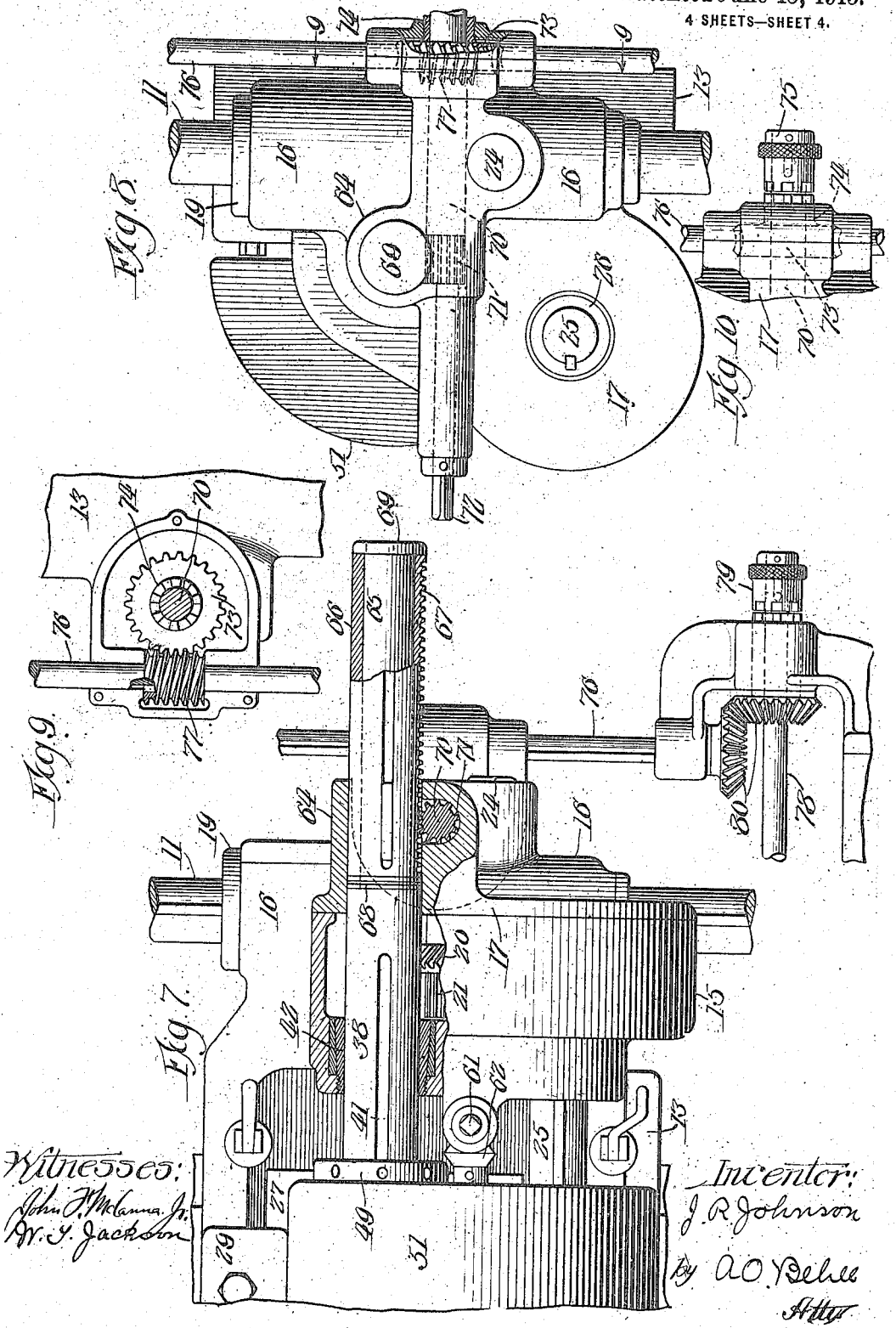

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MILLING-MACHINE SPINDLE-HEAD.

1,143,585.  Specification of Letters Patent.  Patented June 15, 1915.

Application filed September 9, 1913. Serial No. 788,801.

*To all whom it may concern:*

Be it known that I, JOHN R. JOHNSON, a citizen of the United States, residing at Rockford, in the county of Winnebago and the State of Illinois, have invented certain new and useful Improvements in Milling-Machine Spindle-Heads, of which the following is a specification.

This invention relates to spindle heads for milling machines and has for one of its objects the construction of an improved spindle head embodying two telescoping spindles and means for driving same at various speeds.

Further objects are to provide means for feeding the spindles separately, means for locking the spindles together to feed both simultaneously, and in providing means for maintaining the inner spindle concentric with the outer spindle.

Another object of my invention is to equip a spindle with a cutter face-plate and to provide means for driving the spindle at its face-plate end, whereby the drive is transmitted directly to the cutter devoid of torsional variances which cause chattering of the cutter thereby producing defective and unsatisfactory cutting.

In the accompanying drawings: Figure 1 is a face view in elevation of a milling machine of the planer milling type and illustrating my improved spindle heads applied thereto, the means for driving the spindle drive-shafts not being shown. Fig. 2 is a view of a vertical spindle head with its front casing removed and parts shown in section to illustrate the drive means. Fig. 3 is a view looking at the right side of Fig. 2, and with the outer casing broken in section. Fig. 4 is a plan section view taken on the line 4—4 of Fig. 1. Fig. 5 is a plan section view taken on the line 5—5 of Fig. 1. Fig. 6 is a detail vertical sectional view taken on the line of section 6—6 of Fig. 4. Fig. 7 is a face view of the drive end of the horizontal spindle head shown at the right in Fig. 1, illustrating the power feed mechanism for the inner spindle. Fig. 8 is an end view of Fig. 7, a portion of the worm-gear casing being broken away. Fig. 9 is a detail sectional view taken substantially on the line 9—9 of Fig. 8. Fig. 10 is a detail view of the worm-gear drive end which is broken in Fig. 8.

My improvements are illustrated in the drawings applied to a milling machine having a bed 7 with a work carrying table 8 mounted slidable thereon, vertical side housings 9 provided with beveled slideways, and a horizontal cross-housing 10 having slideways, these housing slideways providing supporting means upon which the spindle heads are adapted to be slidably mounted. Vertical spindle drive-shafts 11 and horizontal drive-shaft 12 are to be driven by suitable means as is well understood in the art.

Both vertical and horizontal spindle heads are mounted slidable upon said slideways to carry cutters in operable relation with work mounted upon the work carrying table 8. These spindle heads are of a like construction with the exception that the horizontal head at the left in Fig. 1 and the vertical head which is illustrated in section in Figs. 2 to 6 inclusive, has their inner spindle constructed to be hand operated for feeding and adjusting it longitudinally, this spindle construction being a modified form; while in Figs. 7 and 8 is shown the remaining horizontal spindle head having its inner spindle extended and provided with means for adjusting same longitudinally and power operated means for feeding it likewise; therefore with the exception noted, like reference numerals will apply to like parts on both the horizontal and vertical heads.

Referring to the vertical spindle head, it has a base portion 13 which is provided with slideway engagements 14, at its upper portion with a casing 15, and journals 16 in which the shaft 12 is disposed, the cap 17 forming a closure for the top of said casing 15. A beveled pinion gear 18 is mounted splined upon shaft 12, in one of said journals 16 and held with the base 13 by a collar 19, and is in mesh with a beveled gear 20 which has connected fixedly therewith a spur gear 21 which is mounted upon a stub shaft 22 that has a portion straddling shaft 12 and has ends 24 journaled in the top 17 and base 15. A secondary spindle drive-shaft 25 at right angles to the drive shaft 12 is mounted splined at one end in a gear and sleeve 26 which is journaled in base 15. A spindle carriage 27 is mounted slidable vertically in slideways 28 and gib 29 in connection with the base 13, and is formed with a lateral extension 30 which has journaled therein a roller bearing 31 inclosed in a casing, in which bearing is journaled the lower end of the shaft 25. A spur pinion gear 32 is fixed with said lower end of shaft 25, and a spur gear 33 is fixed to said shaft at the top end of said roller bearing casing. A tapered sleeve spindle 34 is journaled in the extension 30 with a head 35 in abutment with the under side of said extension, said head having a spur gear or bull-gear 36 bolted to its under face, the spur gear being in mesh with the pinion 32 and serving as a face-plate holding means to which a cutter 37 is secured. An inner spindle 38 having a peripheral rack face 39 (modified form of spindle end) and adapted to carry a cutter 40 at its lower end is journaled in said sleeve spindle 34, splined through key-way 41 and has its upper end journaled in a bearing 42 in the base 13. The upper end portion of sleeve spindle 34 is threaded, and screwed thereupon is a nut 43 which bears against end thrust-bearing 44 and holds the sleeve spindle from longitudinal displacement on said extension 30; and fixed to the end of said sleeve spindle is a spur gear 45 with which gear 33 when shifted, is adapted to mesh. A plate 46 is fixed to the upper side of gear 45 and has a tapered screw-threaded sleeve extension 47 fitting about spindle 38 and split at 48 so that the lock-nut 49 when tightened upon said sleeve extension will lock the shaft spindle and sleeve spindle one with the other. A spur pinion 50 is carried by the base 13, in mesh with the rack face of spindle 38, and is adapted to be hand operated to be rotated to slide said spindle longitudinally in the sleeve spindle 34. The preferred type of inner spindle has no peripheral rack face but has its adjusting end journaled in a bearing 64, Fig. 7, which is formed with the casing cover 17, and said spindle has a reduced end 65 upon which is loosely mounted a sleeve member 66 having a rack face 67 and a splined connection with said cover 17, the opposite ends of the sleeve member abutting the thrust-bearing 68 and the collared end 69 of the spindle. A shaft 70 is journaled in the cover 17 and has a pinion 71 in mesh with rack face 67, a hand operable end 72 and a worm-gear 73 loosely mounted upon its opposite end, this worm-gear having a sleeve extension 74 with a clutch face at the end thereof; and a hand operated clutch member 75 keyed to shaft 70 has a clutch face engageable with said worm-gear clutch face. A shaft 76 having a longitudinal keyway is journaled in an extension of cover 17 and a worm 77 in slidable key connection therewith meshes with the worm-gear 73. The shaft 76 is to be clutch driven and I have shown a drive shaft 78 adapted to be continuously driven and having a clutch 79 similar to the hand clutch above described and a gear connection 80 with said shaft 76. A casing 51 inclosing the lower spindle head mechanism is secured to extension 30 and carries in guideways 52, Figs. 3 and 5, a vertically slidable gear shifting member 53 which has a yoked lever 54 in engagement with gear 33, and a rack face 55 with which a spur pinion 56 mounted on the operable stub-shaft 57 meshes, said stub-shaft being rotatable to operate said yoked lever 54 and slide shaft 25 lengthwise, thus disengage gears 32 and 36 and bring gear 33 into mesh with gear 45. The lower end of sleeve spindle 34 is recessed with tapered circular sides 58 and threaded at 59, and inserted screwed into said recess is a spindle bearing-guide 60 which is adapted to keep the cutter end of the inner spindle concentric and free from lateral play relative to the sleeve spindle, the wear being taken up by screwing said guide 60 into the recess. The spindle carriage 27 is movable vertically upon the base 13 by the rotation of shaft 61 which is mounted in an extension of casing 15 and has a bevel gear connection 62 with a shaft 63 which is screw-threaded in connection with said carriage 27, such movement constituting a lengthwise adjustment for the carriage and also a feed movement.

Assuming shaft 12 to be rotating, the secondary spindle drive-shaft 25 will be rotated through bevel gears 18 and 20 and spur gears 21 and 33. With shaft 25 rotating, in its position as shown in Fig. 2, sleeve extension 34 will be rotated at a slow rate of speed through gears 32 and 36; and to obtain a higher rate of speed said shaft 25 will be moved longitudinally to disengage said gear connection and move gear 33 into mesh with gear 45, this movement of said shaft being accomplished by rotating the stub-shaft 57 and operating the gear shifting lever 54. Thus the sleeve spindle may be rotated at various speeds and since the inner spindle is splined thereto it also will be rotated simultaneously with said sleeve spindle, and will be allowed independent lengthwise movement because of said splined connection. Feed of the cutter 37 into work carried by the table 8 is through vertical movement of the carriage 27 actuated by the screw operated feed resulting from rotating shaft 61, although said cutter is more generally maintained in a stationary position and the table carrying the work reciprocated planer type across the cutter. The inner spindle 38 in its modified form may be moved by hand longitudinally independent of the sleeve spindle by the rotation of the gear 50, an extended position of said spindle being shown dotted in Fig. 2, and thus said spindle may be moved to proper cutting relation to an article without moving the position of the larger cutter 37. When inner spindle 38 has been thus suitably adjusted, to put it into a cutting operative position, lock-nut 49 will be tightened upon the tapered sleeve 48 and the inner spindle locked fixed with the sleeve spindle. In this locked position the operating shaft 61 may be rotated and the carriage 27 moved vertically to adjust or feed the cutters 40 and 37 to and away from the article being worked upon. Referring now to the preferred construction of inner spindle, that embodying the power feed, assuming the shaft 78 to be continuously driven and locknut 49 loosened, and with the clutch member 75 engaged, by moving the clutch member 79 into operative position shafts 76 and 70 will be rotated, and the pinion 71 will move the inner spindle 38 lengthwise in a feed or boring movement which is power driven and controlled by the hand clutch 79. To retract the inner spindle both clutch members 75 and 79 are disengaged and the pinion shaft 70 is operated at its end 72 by a hand crank. With both clutches thus disengaged it will be seen that this rotation of end 72 has the same effect upon the inner spindle as that of rotating the pinion 50 in the modified form of spindle, and also, that the two spindles may be locked together and moved simultaneously as one spindle. To maintain the spindle 38 at all times concentric with spindle 34, the tapered sleeve 60 is provided, which may be tightened up from time to time to take up lost lateral play between said spindles.

I claim as my invention.

1. In apparatus of the character set forth, the combination with a movable carriage, of two rotatable cutter spindles carried thereby, one of the spindles being reciprocable within the other to various operative positions, means for locking the reciprocable spindle with said other spindle at any one of its operative positions, and means for rotating the spindles.

2. In apparatus of the character set forth, the combination with a rotatable cutter spindle, of a cutter spindle mounted movable lengthwise within said spindle, a drive member adapted to be continuously driven, and a driving connection between said drive member and inner spindle for moving said inner spindle lengthwise.

3. In apparatus of the character set forth, the combination with a rotatable cutter spindle, of a cutter spindle mounted movable lengthwise within said spindle, a drive member adapted to be continuously driven, a driving connection between said drive member and inner spindle for moving said inner spindle lengthwise, and a control included in said driving connection for intermittently moving said spindle lengthwise.

4. In apparatus of the character set forth, the combination with a rotatable cutter spindle and a spindle mounted movable lengthwise within said spindle, of a drive member, a driving connection between said drive member and inner spindle for moving said inner spindle lengthwise in one direction, and means for retracting the said inner spindle.

5. In apparatus of the character set forth, the combination with a carriage having a feed or adjustment movement, of a rotatable spindle journaled thereon, a spindle mounted reciprocable within said carriage spindle, means for rotating the carriage spindle, a driving connection between the two spindles, a driving member, and a driving connection between the driving member and the inner spindle for reciprocating the inner spindle independent of the said movement of the carriage.

6. In apparatus of the character set forth, the combination with a longitudinally movable cutter spindle, of a spindle mounted movable lengthwise within said spindle, mechanisms for locking the said spindles together and for reciprocating the spindles in their locked position, a driving member, and a driving connection between said driving member and inner spindle for reciprocating the inner spindle independent of the outer spindle when the spindles are unlocked.

7. The combination of a slideway, a carriage slidably mounted thereon, a spindle-carriage mounted upon said carriage with its axis transverse to the slideway, the spindle-carriage being movable axially upon the carriage, a cutter spindle journaled in the spindle-carriage fixed from axial movement and equipped with a fixed gear, a shaft journaled in the spindle-carriage parallel with the spindle and equipped with a gear in mesh with the spindle gear, a drive-shaft parallel with the slideway, passing through the carriage, and a gearing drive connection between the drive-shaft and the spindle-connected shaft, constructed to permit during driving of the cutter spindle, the spindle-connected shaft to be moved axially.

8. The combination of a slideway, a carriage slidably mounted thereon, a spindle-carriage mounted upon said carriage with its axis transverse to the slideway, the spindle-carriage being movable axially upon the carriage, a cutter spindle journaled in the spindle-carriage fixed from axial movement and equipped with a pair of differently sized spaced fixed gears, a shaft journaled in the spindle-carriage parallel with the spindle and being equipped with a pair of differently sized spaced fixed gears which are adapted to be moved into and out of mesh with the gears on the spindle by movement of the shaft axially, a drive-shaft parallel with the slideway, passing through the carriage, and a gearing drive connection between the drive-shaft and the spindle-connected shaft, constructed to permit during driving of the cutter spindle, the spindle-connected shaft to be moved axially.

9. In a milling machine spindle head, the combination of a pair of telescoping cutter spindles splined together, the inner spindle being adjustable axially relatively to the outer spindle to various operative positions, means for locking the inner spindle fixed against axial movement in any of its operative positions, and means for driving the outer spindle.

10. In a milling machine spindle head, the combination of a pair of telescoping cutter spindles splined together, the inner spindle being adjustable axially relatively to the outer spindle, means for driving the outer spindle, and means for moving the inner spindle axially independently of the outer spindle during the said driving of the outer spindle.

11. In a milling machine spindle head, the combination of a pair of telescoping cutter spindles, the inner spindle being movable axially relatively to the outer spindle, an externally threaded and tapered sleeve about the inner spindle and fixed with the outer spindle, and a nut-member on said sleeve adapted to be screwed thereupon to tighten the said sleeve upon the inner spindle to effect locking together of said spindles.

12. In a milling machine spindle head, the combination of a pair of telescoping cutter spindles, the inner spindle movable axially relatively to the outer spindle, and a tapered sleeve mounted upon the inner spindle, received screw-threaded into the cutter end of the outer spindle, and adapted to be adjusted axially to take up lateral play between the spindles and to maintain the spindles relatively concentric.

13. In a milling machine spindle head, the combination of a pair of telescoping cutter spindles, the inner spindle movable axially relatively to the outer spindle, and a tapered sleeve mounted upon the inner spindle received into the cutter end of the outer spindle, and adjustable axially to take up lateral play between the spindles and to maintain the spindles relatively concentric.

14. In a milling machine spindle head, the combination of a pair of telescoping cutter spindles splined together, means for driving the outer spindle, and means for feeding the inner spindle axially independently of the outer spindle during driving of said outer spindle.

15. In a milling machine spindle head, the combination of a cutter spindle movable axially and equipped at one end with a cutter face-plate and a bull-gear, a shaft parallel with said spindle, movable axially and equipped with a fixed pinion-gear in mesh with said bull-gear, a gear splined with the pinion-gear shaft and fixed from axial movement, and gear means for driving said splined gear whereby the spindle and gear-shaft may be moved axially as a unit during driving of the spindle.

16. The combination of a slidably mounted carriage, a cutter spindle journaled thereon fixed from axial movement and being equipped adjacent its cutter end with a fixed bull-gear and with a fixed gear spaced from said end, said carriage having a journal bearing parallel with said cutter spindle and disposed at one side of and intermediate the gears thereon, a shaft journaled in said bearing and having a fixed pinion-gear in mesh with said bull-gear and having a fixed gear disposed intermediate the gears on the spindle, means for moving the shaft axially to withdraw its pinion gear from mesh with the bull-gear and to move the other gear of said shaft into mesh with the second mentioned gear on the spindle, and means for driving said shaft.

17. The combination of a slidably mounted carriage, a cutter spindle journaled thereon fixed from axial movement and being equipped adjacent its cutter end with a fixed bull-gear having a journal bearing parallel with said cutter spindle and disposed at one side of and intermediate the gears thereon, a shaft journaled in said bearing and having a fixed pinion-gear in mesh with said bull-gear and having a fixed gear disposed intermediate the gears on the spindle, the said bearing extending to within close proximity to the bull-gear and the mounting of the shaft in said bearing being such that the shaft may be moved axially to move its pinion-gear into the bearing, the second gear on the shaft being moved into mesh with the second gear on the spindle by this axial movement of the shaft, and means for driving said shaft.

18. The combination of a slidably mounted carriage, a cutter spindle journaled therein fixed from axial movement and being equipped at its cutter end with a fixed bull-gear and spaced from said end with a second fixed gear, said carriage having a journal bearing parallel with said spindle and disposed intermediate the gears thereon, a shaft journaled in said bearing, being equipped with a fixed pinion-gear in mesh with a bull-gear and a fixed gear intermediate the said bearing and the second gear on the spindle, the shaft being movable axially, the mounting of the shaft in said bearing being that such that by movement of the shaft axially the pinion-gear thereof may be drawn from mesh with the bull-gear and into the bearing, this movement carrying the second gear on the shaft into mesh with the second gear on the spindle, means for so moving the shaft axially, and means for driving said shaft.

19. A milling machine spindle head comprising a slidably mounted carriage having a journal bearing, a cutter spindle journaled therein, fixed from axial movement, the spindle being extended beyond the ends of the bearing and equipped at each end with a fixed gear, the carriage having a second journal bearing parallel with the first mentioned gear and being disposed at one side of and intermediate said gears on the spindle, a shaft journaled in said second bearing movable axially therein and being equipped with a pair of fixed gears one in mesh with one of the gears on the spindle, the other gear on the shaft being located intermediate the bearing and the other gear on the spindle, means for moving the shaft axially for withdrawing the first named shaft-gear from mesh and for moving the second mentioned shaft-gear into mesh with the other gear on the spindle, and means for driving the shaft.

20. The combination of a slideway, a carriage slidably mounted thereon, a spindle-carriage slidably mounted on said carriage with its axis transverse to the slideway, the spindle carriage adapted to move axially on said carriage, a cutter spindle journaled in the spindle carriage fixed from axial movement thereon and equipped with a fixed gear, a shaft journaled in the spindle carriage parallel with the spindle and equipped with a fixed gear in mesh with the spindle gear, a drive-shaft parallel with the slideway, and a gearing drive-connection between the drive-shaft and spindle-connected shaft constructed to permit the spindle-connected shaft to be moved axially.

21. The combination of a slideway, a carriage slidably mounted thereon, a spindle-carriage slidably mounted on said carriage with its axle transverse to the slideway, the spindle carriage adapted to move axially on said carriage, a cutter spindle journaled in the spindle carriage, fixed from axial movement thereon and equipped adjacent its cutter end with a bull-gear, a drive-shaft parallel with the slideway, and a drive-connection between the drive shaft and the bull-gear so constructed that the spindle-carriage may be moved axially without affecting the operativeness of said driving-connection.

22. A milling machine spindle head comprising, an axially movable spindle carriage, a spindle journaled therein fixed from axial movement with respect to the carriage and being equipped at its cutter-holding end with a bull-gear, a shaft journaled on the carriage parallel with the spindle, being movable axially with respect to the carriage and being equipped at one end with a pinion-gear in mesh with the said bull-gear, means for holding said shaft fixed from axial movement with respect to the carriage and also for moving the shaft axially to withdraw its pinion-gear from the bull-gear, and means for driving said shaft.

In testimony whereof I have hereunto set my hand in presence of two subscribing witnesses.

JOHN R. JOHNSON.

Witnesses:
  JOHN F. McCANNA, Jr..
  A. O. BEHEL.